(12) United States Patent
Sai et al.

(10) Patent No.: US 7,697,224 B2
(45) Date of Patent: Apr. 13, 2010

(54) STORING AD SAMPLED DATA OF READ/WRITE CHANNEL INTO ECC SRAM

(75) Inventors: Fuminori Sai, Odawara (JP); Yasuhiro Takase, Odawara (JP); Christopher Taylor, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 623 days.

(21) Appl. No.: 11/638,969

(22) Filed: Dec. 13, 2006

(65) Prior Publication Data

US 2008/0144207 A1    Jun. 19, 2008

(51) Int. Cl.
*G11B 20/10* (2006.01)
(52) U.S. Cl. .......................................... 360/39; 360/69
(58) Field of Classification Search ........................ None
See application file for complete search history.

(56) References Cited

U.S. PATENT DOCUMENTS 5,245,430 A * 9/1993 Nishimura .................. 348/497
6,583,942 B2 * 6/2003 Seng et al. .................... 360/31
6,937,415 B2 * 8/2005 Galbraith et al. .............. 360/53

FOREIGN PATENT DOCUMENTS

JP        2000-105901        4/2000

* cited by examiner

*Primary Examiner*—Jason C Olson
(74) *Attorney, Agent, or Firm*—Townsend and Townsend and Crew LLP; Patrick Duncan (57) ABSTRACT

An embodiment in accordance with the present invention enables storing in a memory, multi-bit data corresponding to analog signals read from a medium before being converted to single-bit data as recorded data. In an embodiment of the present invention, an AD converter is configured to convert analog signals from a magnetic disk to multi-bit data. A buffer circuit holds successively multi-bit data transferred from the AD converter toward a Viterbi decoder, and outputs the held plural multi-bit data in parallel. A SRAM for ECC is used for storing multi-bit data transferred from the buffer circuit.

9 Claims, 7 Drawing Sheets

STORING AD SAMPLED DATA OF READ/WRITE CHANNEL INTO ECC SRAM

BACKGROUND OF THE INVENTION

Embodiments in accordance with the present invention relate to a media drive apparatus and a control circuit for a media drive apparatus. In particular, embodiments in accordance with the present invention relate to a technique to store a multi-bit data corresponding to signals read from a medium before converting it to a single bit data as a recorded data.

Medium drive apparatuses using various medium such as an optical disk, a magnetic tape, and a flexible magnetic disk are known in the art. In particular, a hard disk drive (HDD) has been widely used as a storage device of a computer. The HDD is one of indispensable storage devices for current computer systems. The HDD has found widespread application such as a removable memory used in a moving image recording/reproducing apparatus, a car navigation system, a cell phone, or a digital camera, in addition to the computer, due to its outstanding characteristics.

A magnetic disk in the HDD has plural concentric data tracks, each of which records plural servo data including address information and plural data sectors. A head element accesses to a desired data sector based on address information of the servo data, making it possible to write/read data to/from the data sector.

An AD converter in a channel circuit converts analog signals from the head element to multi-bit data. The multi-bit data from the AD converter are processed by a digital FIR filter and then converted to single bit data by a decoder. The single bit data are the data recorded on the magnetic disk.

It has been previously known to hold the output of the AD converter in the channel circuit and use it for an error recovery process or circuit design of a HDD. For example, Japanese Unexamined Patent Application Publication No. 2000-105901 discloses use of multi-bit data stored in a memory in a retry process for a read error. Specifically, waveform samples from an AD converter operation are stored in a memory in a channel circuit. If an ECC process is not capable of correcting user data, the HDD obtains the waveform data stored in the memory in the channel circuit and retry the subsequent process of read data.

Use of waveform data of one sector as disclosed in the above prior art document enables to re-decode the read data without accessing to the data on the magnetic disk. The technique of the above prior art reference, however, has some possible disadvantages. For one thing, the memory in the channel circuit dedicated to storing the AD converter output values increases the circuit area.

The technique of the prior art reference also has an issue regarding the transmission speed. In a typical HDD, the data transfer rate in the channel circuit is about 1 Gbit/s. This transfer rate is for the decoded single bit data, and the total amount of the AD converted data is a multiple of the bit number of the AD conversion. A typical bits of the AD conversion is 6-bit, therefore the transfer rate for storing the AD converted data is about 6 Gbit/s. A high performance memory may be necessary to store data of such a high transfer rate, resulting in higher demands on the circuit performance and higher cost.

BRIEF SUMMARY OF THE INVENTION

An embodiment in accordance with the present invention enables storing in a memory, multi-bit data corresponding to analog signals read from a medium before being converted to single-bit data as recorded data. In an embodiment of the present invention, an AD converter is configured to convert analog signals from a magnetic disk to multi-bit data. A buffer circuit holds successively multi-bit data transferred from the AD converter toward a Viterbi decoder, and outputs the held plural multi-bit data in parallel. A SRAM for ECC is used for storing multi-bit data transferred from the buffer circuit.

The above and other objects, advantages and features of the present invention will be more apparent from the following description taken in conjunction with the accompanying drawings.

DETAILED DESCRIPTION OF THE INVENTION

Embodiments in accordance with the present invention enable storing in a memory, multi-bit data corresponding to analog signals read from a medium before being converted to single-bit data as recorded data. Particular embodiments in accordance with the present invention relate to an AD converter configured to convert analog signals from a magnetic disk to multi-bit data. A buffer circuit holds successively multi-bit data transferred from the AD converter toward a Viterbi decoder, and outputs the held plural multi-bit data in parallel. A SRAM for ECC is used for storing multi-bit data transferred from the buffer circuit.

A control circuit for a medium drive apparatus according to an embodiment of the present invention includes: an AD converter for converting analog signals transferred from a medium to multi-bit data; a decoding circuit for decoding multi-bit data transferred from the AD converter to corresponding single bit data; a buffer circuit for holding successively multi-bit data transferred from the AD converter toward the decoding circuit and parallelizing a plurality of the multi-bit data to transfer; and a memory used for storing data transferred from the buffer circuit. The buffer circuit parallelizing a plurality of the multi-bit data reduces the clock frequency for storing the multi-bit data. The input bus width of the memory for storing the multi-bit data is wide enough to receive the parallelized multi-bit data accordingly.

The control circuit may further include a circuit for equalizing multi-bit data transferred from the AD converter toward the decoding circuit, and wherein the buffer circuit holds successively output data of the circuit for equalizing. Furthermore, the control circuit may further include a selection circuit for selecting a circuit for outputting multi-bit data to the buffer circuit from plural circuits including the AD converter and the circuit for equalizing. The selectability of the data to be stored enhances the various applications of the data.

The control circuit may further include a circuit for obtaining multi-bit data transferred from the AD converter toward the decoding circuit to output control data for clock generation, and wherein the buffer circuit holds successively the control data. Furthermore, the control circuit may further include a selection circuit for selecting a circuit for outputting multi-bit data to the buffer circuit from plural circuits including the AD converter and the circuit for outputting the control data. The selectability of the data to be stored enhances the various applications of the data.

The control circuit may further include: a circuit for equalizing multi-bit data transferred from the AD converter toward the decoding circuit; a circuit for obtaining multi-bit data transferred from the AD converter toward the decoding circuit to output control data for clock generation; and a selection circuit for selecting a circuit for outputting multi-bit data to the buffer circuit from plural circuits including the AD converter, the circuit for equalizing and the circuit for outputting the control data. The selectability of the data to be stored enhances the various applications of the data.

In some embodiments, the memory is used both for storing data from the buffer circuit, and processing the single bit data decoded by the decoding circuit. Hence, the increase of the circuit area is avoided.

A medium drive apparatus according to another aspect of the invention includes: a head accessing to a medium; an AD converter for converting analog signals transferred from the medium to multi-bit data; a decoding circuit for decoding multi-bit data transferred from the AD converter to corresponding single bit data; a buffer circuit for holding successively multi-bit data transferred from the AD converter toward the decoding circuit before being decoded to the corresponding single bit data, and parallelizing a plurality of the multi-bit data to transfer; and a memory used for storing data transferred from the buffer circuit.

A control circuit for a medium drive apparatus according to an embodiment of the present invention includes: an AD converter for converting analog signals transferred from a medium to multi-bit data; a decoding circuit for decoding multi-bit data transferred from the AD converter to corresponding single bit data; a memory used for an error correction process of data from the medium and used for storing data transferred from the AD converter toward the decoding circuit. Hence, the multi-bit data is stored without increasing the circuit area.

The control circuit may further include: a buffer circuit for holding successively multi-bit data transferred from the AD converter toward the decoding circuit and parallelizing a plurality of the multi-bit data to be transferred, and wherein the memory stores parallel output data from the buffer circuit.

The above and other features of embodiments in accordance with the present invention will become more fully understood from the detailed description given herein below and the accompanying drawings which are given by way of illustration only, and thus are not to be considered as limiting the present invention.

Embodiments in accordance with the present invention will be now described herein with reference to illustrative embodiments. Those skilled in the art will recognize that many alternative embodiments can be accomplished using the teachings of the present invention, and that the invention is not limited to the embodiments illustrated for explanatory purposed.

Hereinafter, an embodiment of the present invention is described. For ease of explanation, the following description and the accompanying drawings are omitted and simplified as appropriate. Throughout the drawings, the same components are denoted by like reference numerals, and their repetitive description is omitted if not necessary for the sake of simplicity. In the following description, an embodiment of the present invention is explained taking a hard disk drive (HDD) as an example of a medium drive device.

A feature of the present embodiment is a technique to store a multi-bit data corresponding to an analog data read from a magnetic disk in a memory, before converting the multi-bit data to a single bit data that is a recorded data.

Figure 1:
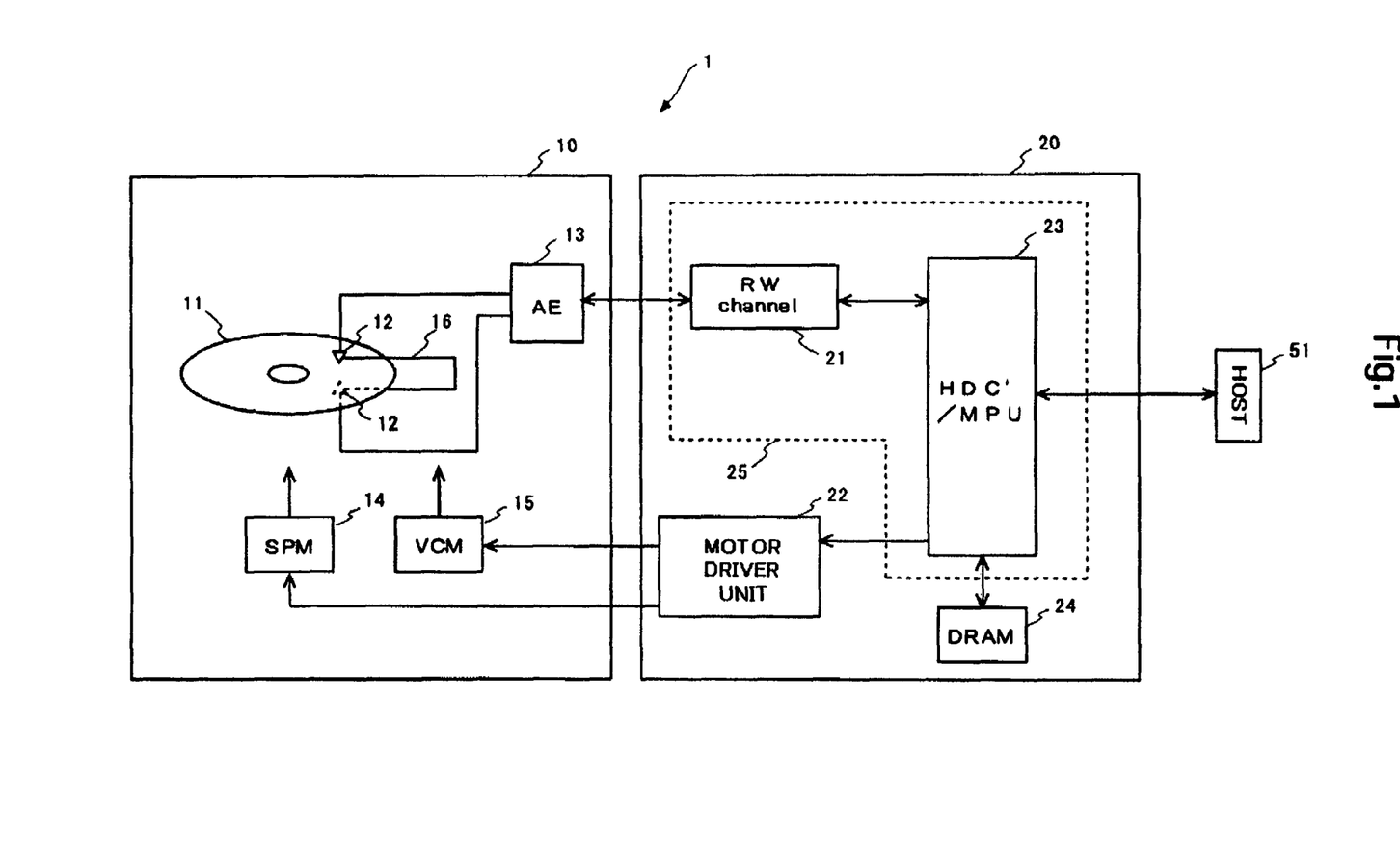
FIG. 1 is a schematic block diagram showing the entire configuration of a hard disk drive according to an embodiment of the present invention.

To facilitate the understanding of a feature of this embodiment, the entire configuration of the HDD is first outlined. As shown in FIG. 1, a HDD I has a magnetic disk 11, which is an example of medium, head elements 12, an arm electronics (AE) 13, a spindle motor (SPM) 14, a voice coil motor (VCM) 15 and an actuator 16 in an enclosure 10.

The HDD 1 has a circuit board 20 fixed at the outside of the enclosure 10. On the circuit board 20, it has a read write channel (RW channel) 21, a motor driver unit 22, an integrated circuit of hard disk controller (HDC) and MPU (hereinafter HDC/MPU) 23 and DRAM 24. In the present embodiment, the RW channel 21 and the HDC/MPU 23 are implemented in a system on chip (one chip SoC). The motor driver unit 22 and the DRAM 24 are implemented in different IC chips respectively.

The SPM 14 rotates the magnetic disk 11 at a predetermined rotation speed. The motor driver unit drives the SPM 14 in accordance with control data from the HDC/MPU 23. The magnetic disk 11 in this embodiment has data surfaces on which data are recorded on the both side, and the HDD 1 has head elements 12 each of which corresponds to the each data surface.

The each head element 12 is on a slider (not shown) and the slider is fixed to the actuator 16. The actuator 16 is coupled to the VCM 15 and pivots about a pivot shaft to move the head elements 12 (and the slider) over the magnetic disk 11 in the radius direction. The motor driver unit drives the VCM 15 in accordance with control data from the HDC/MPU 23.

The head element 12, typically, has a write element converting electric signals to magnetic fields in accordance with write data and a read element converting magnetic fields from the magnetic disk 11 to electric signals. The HDD 1 may have one or plurality of magnetic disks and the magnetic disk 11 may have two data surfaces or only one data surface. Also, the present invention may be applied to a medium drive apparatus with only a read element. The AE 13 selects one head element 12 from the plural head elements 12 for data access. The AE 13 (preamplifier) amplifies the reproduction signal from the selected head element 12 at a constant gain. Further, the AE 13 transfers the recording signal from the RW channel 21 to the selected head element 12.

The RW channel 21 encodes write data from the HDC/MPU 23 in the write process and converts the encoded write data to write signals and provide it to the AE 13. In the read process, the RW channel 21 amplifies analog read signals from the AE 13 to a given constant level, extracts data from the read signals and decodes them. The extracted data include user data and servo data. The decoded read data are supplied to the HDC/MPU 23. The RW channel 21 of the present embodiment has a circuit which performs the process for storing multi-bit data (multi-value data) corresponding to the read signals from the magnetic disk 11 before being converted to single-bit data. The process in the RW channel 21 of the present embodiment will be described in detail later.

The MPU of the HDC/MPU 23 operates according to micro codes loaded into the DRAM 24. In response to the startup of the HDD 1, data for control and data process in addition to the micro codes acting on the MPU are loaded into the DRAM 24 from the magnetic disk 11 or ROM (not shown). The HDC is configured as a logical circuit and cooperate with the MPU for various processes. For instance, the HDC/MPU 23 performs required processes for data process such as the management of the ordering of the command execution, the head positioning control, the interface control, the defects management and the like. The HDC/MPU 23 also controls the entire system of the HDD 1. The HDC/MPU 23 of the present embodiment has a function of storing the multi-bit data transferred from the RW channel 21, which will be described later.

The HDC/MPU 23 transfers the read data from the magnetic disk 11 obtained from the RW channel 21 to a host 51. The read data from the magnetic disk 11 are stored temporarily in the read buffer in the DRAM 24 and transferred to the host 51 via the HDC/MPU 23. The write data from the host 51 are stored temporarily in the write buffer in the DRAM 24 and transferred to the magnetic disk 11 via the HDC/MPU 23 at a specific timing.

Figure 2:
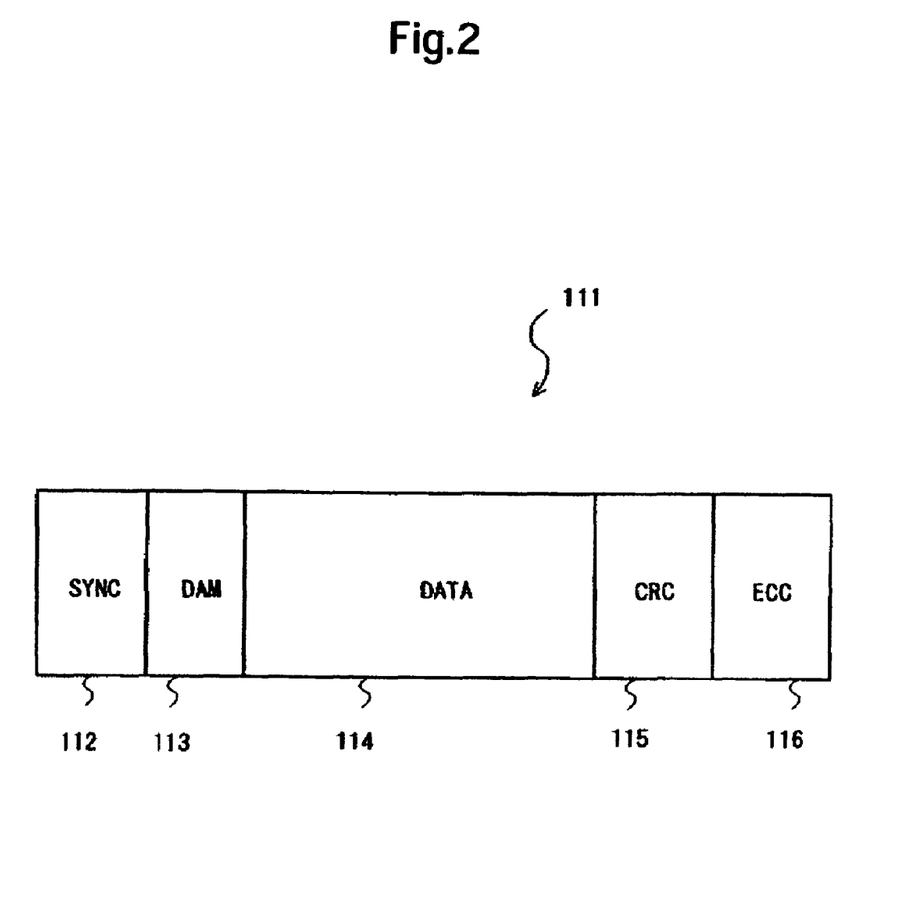
FIG. 2 illustrates the data sector format stored on the tracks of the magnetic disk according to an embodiment of the present invention.

FIG. 2 illustrates the data format of a data sector, which is a recording unit of user data on the magnetic disk 11. The data sector 11 contains a SYNC 112, a data address mark (DAM) 113, a user data section 114, a Cyclic Redundancy Check (CRC) 115 and an Error Correction Code (ECC) 116. The SYNC 112 is a signal of a constant frequency and the PLL in the RW channel 21 acts in sync with the SYNC 112. The variable gain amplifier in the RW channel 21 receives the SYNC 112 and adjusts its gain so that the output amplitude of the SYNC 112 equals to a reference value.

The CRC 115 and the ECC 116 are redundancy codes for error correction and check. The CRC 115 and the ECC 116 are added for the error correction in the data recording to the magnetic disk. The HDC/MPU 23 uses the ECC 116 to perform the error correction of the read data. The HDC/MPU 23 uses the CRC 115 for verifying the error correction to prevent the correction error rarely occurring from the ECC 116. Reed-Solomon Code is typically used for the ECC 116. The ECC process of user data will be described later.

Next, the process in the RW channel 21 will be described. The process mode of the RW channel 21 changes according to the control signals (gate signals) from the HDC/MPU 23. The RW channel 21 converts data with ECC/CRC transferred from the HDC/MPU 23 to data appropriate for recording in the write operation. The conversion is subject to a constraint of satisfying the Run Length Limited (RLL) condition in a given size of block, which adds some redundancy to the block. Parity data added to each block also increases the redundancy. The ratio of the data length of the actual block with redundancy to the data length of the original data is called the code rate. Typically, the code rate of 60/62 is adopted, for example.

Figure 3:
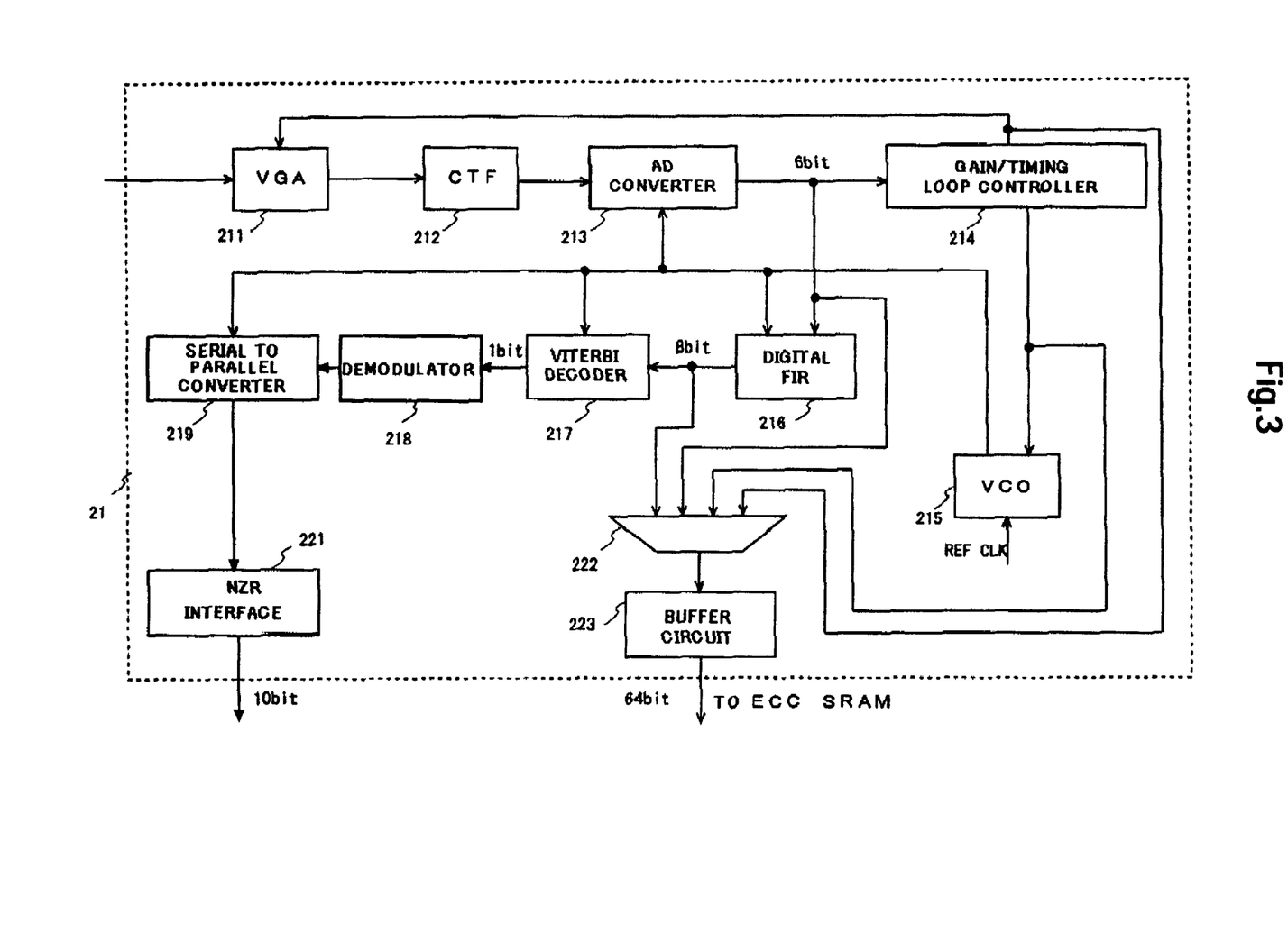
FIG. 3 shows the circuit configuration relating to the read operation and the multi-bit data storing operation according to an embodiment of the present invention.

Next, the read process of the RW channel 21 will be described. FIG. 3 illustrates the configuration relating to the read process of data sectors in the RW channel 21. The RW channel 21 has a Variable Gain Amplifier (VGA) 211, an analog equalizing filter circuit (Continuous Time Filter: CTF) 212, an AD converter 213, a gain/timing loop controller 214, Volume Controlled Oscillator (VCO) 215, a digital FIR filter 216, a Viterbi decoder 217, a demodulator 218, a serial to parallel converter 219 and a Non Return to Zero (NZR) interface circuit 221.

Analog read signals from the AE 13 goes into the VGA 211 constituting a part of Auto Gain Control (AGC). The VGA 211 amplifies the incoming signal to a constant level at the gain set by the feed back from the gain/timing loop controller 214. The CTF 212 performs a noise removal process from the input analog signals from the VGA 211 and a waveform equalizing process for slicing the waveform. The equalized analog signals are converted to digital signals of multi-values through sampling and quantization by the AD converter 213. In the example of FIG. 3, the sampled value of the AD converter 213 is a 6 bit multi- bit data.

The output data of the AD converter 213 are provided to the digital FIR filter 216. The digital FIR filter 216 performs a transversal filtering of the input digital signals. More specifically, the digital FIR filter 216 shapes the input signals for correct data reproduction and equalizes the input signals to the target waveform for the Viterbi decoder 217. In the example shown in FIG. 3, the digital FIR filter 216 has 10 taps (4 delay elements) and the output data is a 8 bit multi- bit data.

The Viterbi decoder 217 processes the waveform equalized by the digital FIR filter 216 in a Partial Response Maximum Likelihood (PRML) circuit and outputs RLL signals. The Viterbi decoder 217 determines the most likely 1 bit data sequence based on the context of the input data sequence. As described above, the Viterbi decoder 217 converts the multi-bit data corresponding to the readout signal amplitude to the single-bit data which are recorded data. Therefore, the output data are single-bit data (0 or 1). The single-bit data determined by the Viterbi decoder 217 have redundancy added by the RW channel 21. The Parity post processor (PPP) for error correction follows the Viterbi decoder 217 of this example. The PPP verifies the correctness of the block data with parity added to the block. The data is corrected, if it is not correct, through the error detection filter expected from the parity of the error.

The demodulator 218 demodulates the RLL data decoded by the Viterbi decoder 217 to the original data. The serial to parallel converter 219 converts the demodulated serial single-bit data to parallel data. In this embodiment, the serial to parallel converter 219 consolidates ten 1-bit data to produce 10-bit data from the 1-bit data stream and outputs the 10-bit parallel data. The parallel data from the serial to parallel converter 219 are transferred to the HDC/MPU 23 through the NRZ interface circuit 221. The transfer rate of the read signal from the magnetic disk is approximately 1 Gbit/s, thus the clock to transfer the data from the RW channel 21 to the HDC/MPU 23 is approximately 100 MHz.

Each circuit in the RW channel 21 acts according to the clock from the VCO 215. The VCO 215 generates the clock with PLL in accordance with the feed back from the gain/timing loop controller 214 and the reference clock from a crystal oscillator (not shown). The gain/timing loop controller 214 obtains the output data of the AD converter 213 and detects the difference between the ideal sampling timing and the actual timing. The gain/timing loop controller 214 sets the control data on the VCO 215 so as to compensate the timing difference. The gain/timing loop controller 214 may use the output of the digital FIR filter 216. Further, the gain/timing loop controller 214 sets the gain of the VGA 211 from the output data of the AD converter 213.

Figure 4:
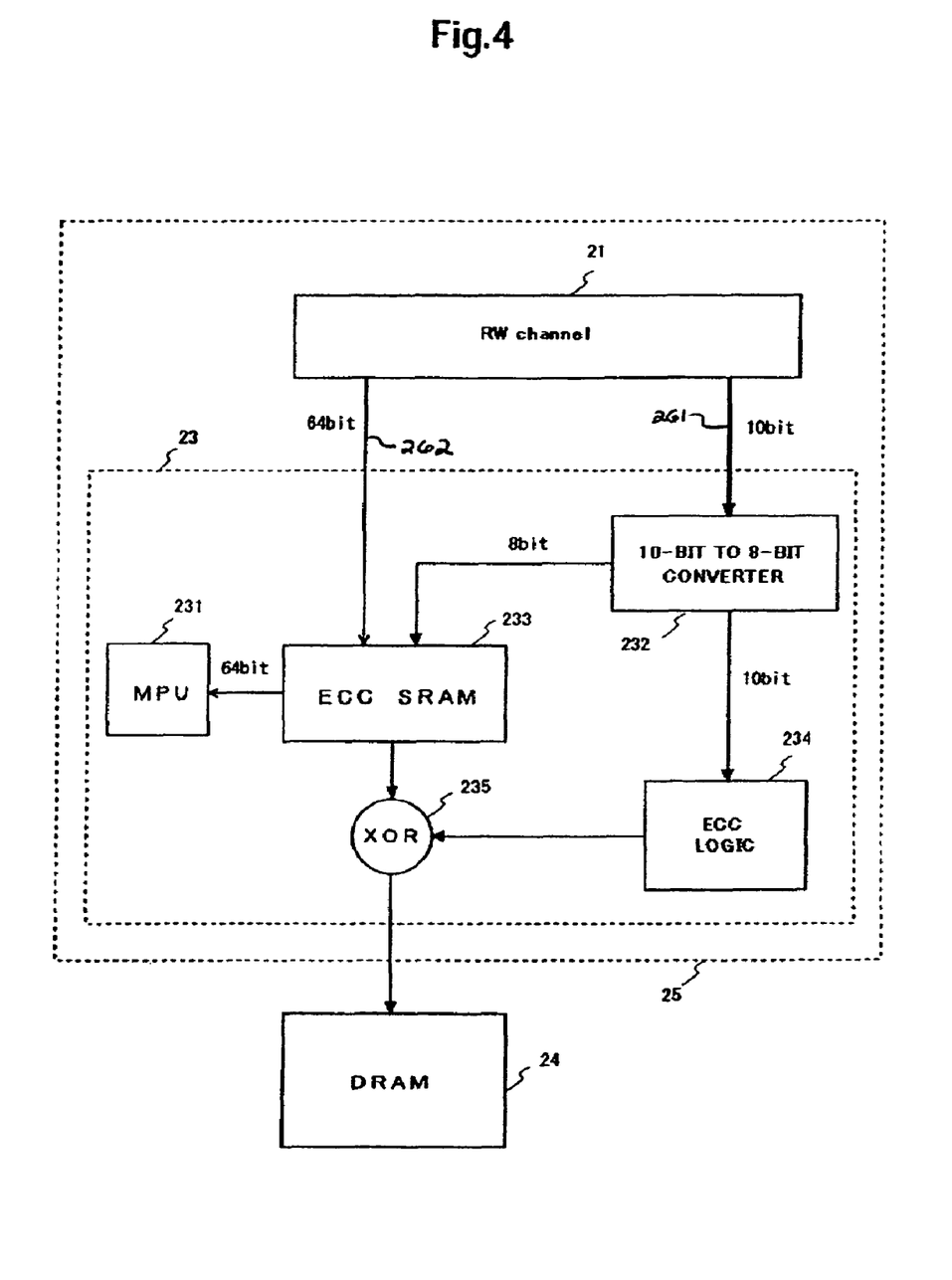
FIG. 4 illustrates the functional elements relating to the error correction process and the multi-bit data storing process in the HDC/MPU according to an embodiment of the present invention.

The RW channel 21, as aforementioned, determines the original data from the waveform data sequence sampled by the AD converter 213 through signal processing. If the PPP cannot correct an error, the HDC/MPU 23 corrects the error in the error correction process. FIG. 4 illustrates the functional elements relating to the error correction process of the HDC/MPU 23. In FIG. 4, a 10-bit transfer line 261 transfers the output data of the NRZ interface circuit 221.

The 10-bit parallel data transferred from the RW channel 21 through a NRZ data transfer bus are stored in a SRAM for ECC 233 after converted to 8 bit and further parallelized to 64 bit data by the converter 232. ECC logic 234 obtains the 10-bit data from the converter 232. The ECC logic 234 has two modes. One is the On The Fly mode (OTF mode), which is an on-line error correction. The other is the off-line error correction mode. The ECC logic 234 is set in the OTF mode by default and switches to the off-line error correction mode if the OTF error correction does not work.

The OTF mode takes in symbols of data sectors successively and transfers user data to the host 51 while correcting errors. If the ECC logic 234 acquires symbols which the OTF mode is incapable of correcting, the off-line error correction mode stops the acquisition of the symbols and the transfer of the user data, and corrects the errors of the symbols. The ECC logic 234 resumes acquiring data from R/W channel 21 in a normal read mode and transferring the user data after the error correction in the off-line error correction mode.

The processes of the OTF mode and the off-line error correction mode are different. The off-line error correction mode suspends the consecutive data read and reads the data sector optimizing the parameters for the error correction of the data sector. Both of the OTF mode and the off-line error correction mode utilize CRC and ECC transferred from the RW channel 21 to perform the error correction processes. For example, Reed-Solomon Code, which can be established in a Galois extension field $GF(2^{10})$, may be used for ECC.

An exemplary process in the OTF mode will be described hereafter. The ECC logic 234 calculates error data consisting of error positions and error patterns based on symbols of read data transferred from the RW channel 21. An XOR operator 235 XORs the error data calculated by the ECC logic 234 with the original data stored in the SRAM 233. Thus, the errors of the original data are corrected. The error corrected data is stored once in the DRAM 24 and then transferred to the host 51.

If the HDC/MPU 23 can not correct errors in the error correction process, the data sector is unreadable. The analog signal waveform process plays an important role in the above read process. It is effective to store the sampled values of the AD converter 213 in a memory for signal characteristics analysis and FA in the development of the HDD 1 or the error recovery process in the HDD 1. In addition to the sampled values of the AD converter 213, the output values of the digital FIR filter 216 and the feed back value of the gain/timing loop controller 214 are also effective as multi-bit digital data to failure analysis of the drive or other usage of this function such as error recovery process.

The HDD 1 of the present embodiment stores the multi-bit data in the SRAM 233 usually used for ECC. In FIG. 4, the 64-bit wide bus 262 transfers the multi-bit data from the RW channel 21 to the SRAM 233. The MPU 231 obtains the multi-bit data stored in the SRAM 233 to utilize it for FA and signal characteristics analysis in the RW channel 21 in the design stage, or utilize it in the error recovery process in the product HDD 1.

In FIG. 4, the word width of the access to the SRAM 233 is 64-bit. It is the same as the bus width used in the normal read mode and enough for storing the multi-bit data. The use of the SRAM 233 for ECC for storing the multi-bit data eliminates the need for another dedicated memory in the circuit. In this embodiment, the SRAM 233 has the input/output control logic in addition to the memory area for storing data.

It is possible to store the multi-bit data in the DRAM 24. The DRAM 24, however, needs the refresh operation and it is difficult to adjust the operation speed of the DRAM 24 to the ADC sampling rate in the RW channel 21. Meanwhile, the memory for ECC is a SRAM, and the SRAM 233 has a memory area for several sectors. Therefore, all the multi-bit data or the most of it can be stored.

An important aspect is the data transfer method from the RW channel 21 to the SRAM 233 in the HDC/MPU 23. The usual data transfer bus between the RW channel 21 and the HDC/MPU 23 is the NRZ bus 261. However, it is difficult for the NRZ bus 261 to transfer the multi-bit data since the NRZ bus 261 has only a 10-bit transfer width. More specifically, if the data rate is 1200 Mbit/s and the redundancy due to the encoding in the RW channel 21 is 60/62, the operation clock of the AD converter 213 is 1240 MHz. Six-bit sampling values are produced at this rate.

Meanwhile, the transfer rate of the NRZ bus 261 is 1200 Mbit/s. Since the NRZ bus 261 has 10 transfer lines, the transfer clock of almost 120 MHz is enough for the NRZ bus 261. Actual transfer clocks of the NRZ bus 261 are about the same speed. Thus, the ordinary NRZ bus 261 can not transfers the multi-bit data from the RW channel 21 to the ECC SRAM 233.

The HDD 1 of the present embodiment is provided with another bus having a wider bus width for transferring the multi-bit data at a low clock frequency like the NRZ bus 261. In FIG. 4, the bus 262 has a 64-bit bus width. It allows the SRAM for ECC 233 to store the multi-bit data at the usual operation clock in the HDC/MPU 23. Further, the RW channel 21 and the HDC/MPU 23 of the present embodiment are implemented in one chip. Therefore, it is easy to implement a bus having a wide bus width between them.

The RW channel 21 consolidates a plurality of the multi-bit data (it is called multiplexing hereinafter) and the bus 262 transfers the multiplexed multi-bit data in parallel. It allows the multi-bit data produced according to the high speed clock in the RW channel 21 to be transferred and stored in the ECC SRAM 233 at lower clock rate.

Returning to FIG. 3, the buffer circuit 223 obtains the multi-bit data before being converted to the single bit data and multiplexes (consolidates) them. Furthermore, the buffer circuit 223 transfers the multiplexed plural multi-bit data to the SRAM 233 as a parallel data on the bus 262. For instance, the buffer circuit 223 obtains the 8-bit outputs from the digital FIR filter 216 to create a 64-bit parallel data equivalent to eight 8-bit data. The bus 262 transfers the 64-bit parallel data to the SRAM 233.

As is shown in FIG. 3, the selector 222 selects the input data to the buffer circuit 223. The data to be selected are taken from the various points in the R/W channel. In the example illustrated in FIG. 3, the selector 222 selects one from the outputs of the AD converter 213, the digital FIR filter 216 and the gain/timing loop controller 214. The output multi-value data of the gain/timing loop controller 214 to the selector 222 include the gain feed back and the timing feed back for the clock generation.

As aforementioned, the HDD 1 of the present embodiment has a function to select one output data from a plurality of circuits to store the selected data, thereby achieving the various and precise analysis in the design stage and improving the error correction capability. In this example, the number of bits of the data from each circuit is no more than 8. For example, the output of the AD converter 213 is a 6-bit data, and the output of the digital FIR filter 216 is an 8-bit data. In the following example, it is assumed that the selector 222 adds one or some bits to the data less than 8 bits to convert the data to an 8-bit data.

Figure 5:
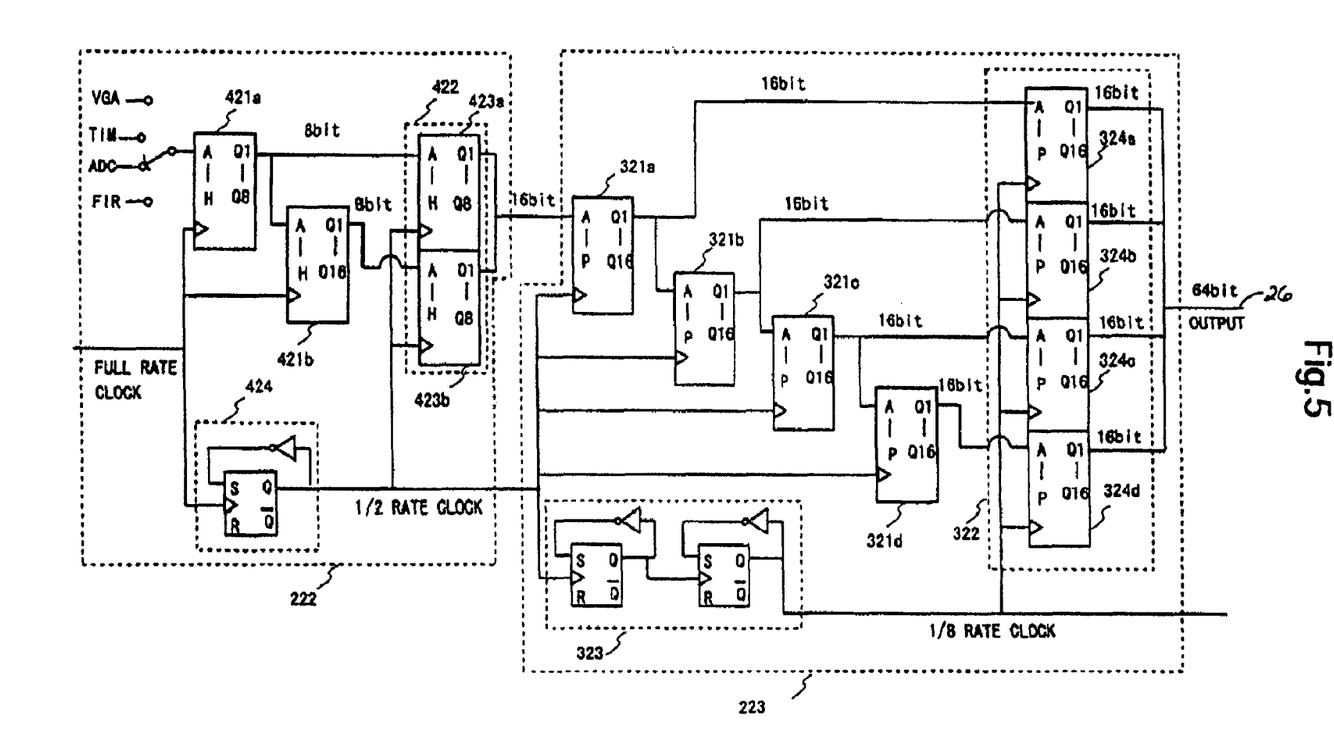
FIG. 5 is a circuit diagram showing the configuration of the selector and the buffer circuit in the RW channel according to an embodiment of the present invention.

FIG. 5 illustrates the circuit configuration of the selector 222 and the buffer circuit 223. The selector 222 of this embodiment consolidates the output data from each circuit to generate 16-bit data. The selector 222 provides the 16-bit data to the buffer circuit 223. For example, the selector 222 obtains the n-th 8-bit data FIRn and n+1-th 8-bit data FIRn+1 and consolidates them into a 16-bit data. The data selected by the selector 222 is one of the output of the AD converter 213 (ADC), the output of the digital FIR filter 216 (FIR), the gain feed back of the gain/timing loop controller 214 (VGA) and the timing feed back of the gain/tining loop controller 214 (TIM).

Specifically, the selector 222 has 2 stages of 8-bit registers 421a, 421b operating in sync with a reference clock (FULL RATE CLOCK) and 16-bit output register 424 operating in sync with a ½ rate clock. The output register 422 store each output of the 8-bit registers 421a, 421b. The output register 422 has 8-bit registers 423a, 423b connected in parallel. A frequency divider 422 produces the ½ rate clock from the reference clock (FULL RATE CLOCK).

The 8-bit register 421a takes in the data selected from the outputs of the four circuits and puts out the stored 8-bit data to the 8-bit registers 421b and 423a at the next clock timing. When the 8-bit registers 421a takes in the data from the selector, it is already an 8-bit data format. The 8-bit register 421b stores the output data from the 8-bit register 421a and outputs the stored 8-bit data to the 8-bit register 423b at the next clock timing.

The 8-bit registers 423a, 423b are connected in parallel and take in at the same time the output data of the 8-bit registers 421a, 421b, respectively. The 8-bit registers 423a, 423b provide outputs to the buffer circuit 223 at the next clock timing. The operation clock frequency of the 8-bit registers 423a, 423b is a half of the 8-bit registers 421a, 421b, and the output from the 8-bit registers 423a, 423b is a 16-bit output.

The buffer circuit 223 has multiple stages (4 stages) of 16-bit registers 321a-321d and an output register 322 which latches the output from the each register. The output register 322 has four 16-bit registers 324a-324d, and the each output of the 16-bit registers 321a-321d is applied to each of the 16-bit registers 324a-324d.

The ½ rate clock of the reference clock (FULL RATE CLOCK) is applied to the 16-bit registers 321a-321d. The reference clock is a usual operation clock in the RW channel 21, and the sampling rate of the AD converter 213 is equivalent to the reference clock, for example. A frequency divider 323 divides the ½ rate clock by 4 to produce a ⅛ rate clock. The ⅛ rate clock is applied to the output register 322. The output register 322 puts 64-bit data on to the bus 26 in accordance with the ⅛ rate clock. The ⅛ rate clock is also fed to the HDC/MPU 23. The SRAM 233 stores data in accordance with the ⅛ rate clock.

Figure 6:
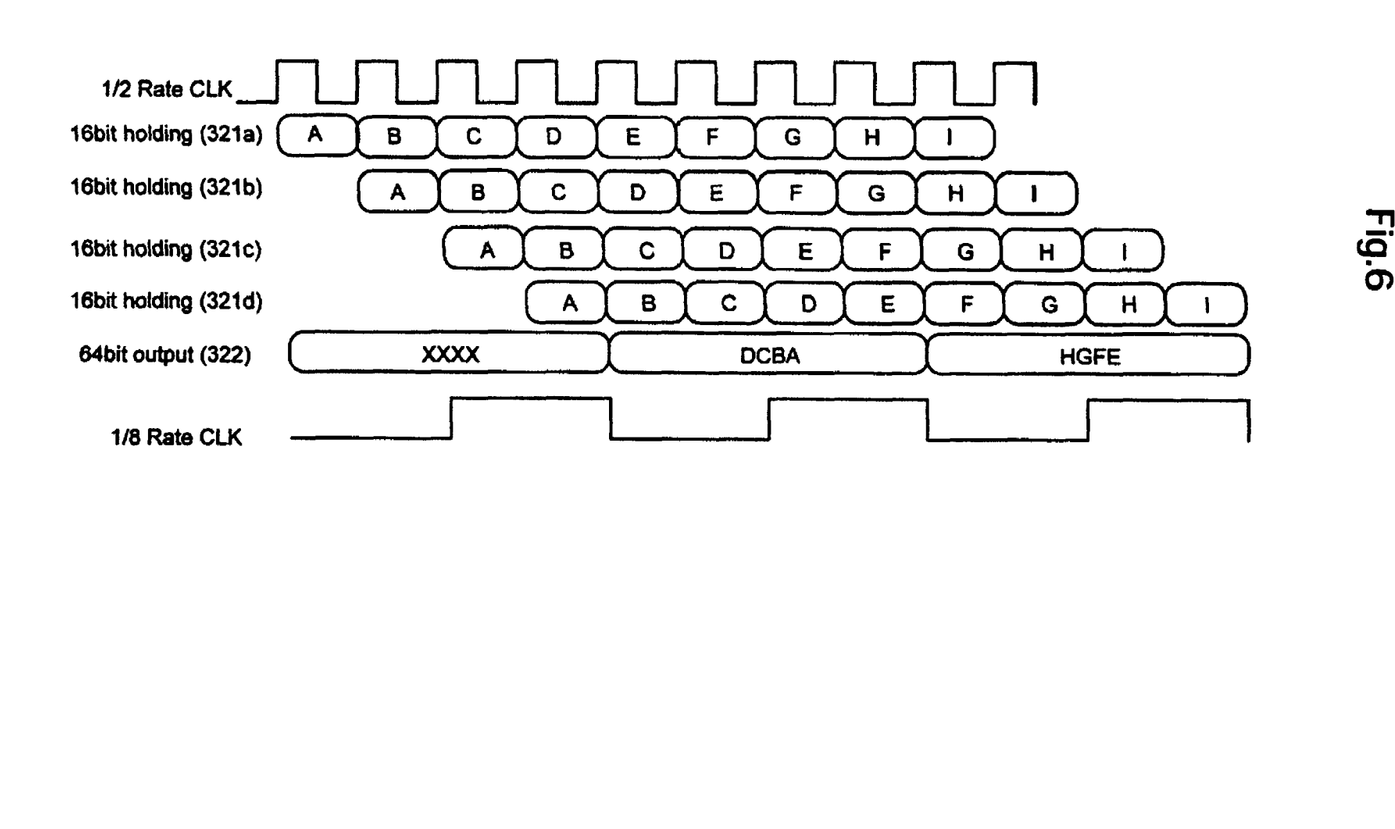
FIG. 6 is a timing chart showing the circuit operation of the buffer circuit according to an embodiment of the present embodiment.

FIG. 6 designates a timing chart of the operation of the buffer circuit 223. The first 16-bit register 321a takes in a 16-bit data A in response to the rising of the ½ rate clock. At the next rising edge of the ½ rate clock, the second 16-bit register 321b takes in the 16-bit data A, which is the output of the first 16-bit register 321a. Further, the first 16-bit register 321a takes in a 16-bit data B.

The buffer circuit 223 repeats the similar process, resulting in that a 16-bit data D is stored in the first 16-bit register 321a, a 16-bit data C is stored in the second 16-bit register 321b, the 16-bit data B is stored in the third 16-bit register 321c, and the 16-bit data A is stored in the fourth 16-bit register 321d. The output register 322 takes in the outputs of the 16-bit registers 321a-321d in response to the rising of the ⅛ rate clock. Namely, the output register 322 stores 64-bit data DCBA. The 64-bit data DCBA is transferred to the SRAM 233 through the 64-bit bus 262.

The buffer circuit 223 repeats the similar process to store 16-bit data sequentially in each of the 16-bit registers 321a-321d and the output register 322 takes in the 64-bit data consisting of the four 16-bit data. Further, the output register 322 put eight 8-bit data in parallel onto the bus 262 to the SRAM 233. The parallel output of a plurality of multi-bit data can reduces the frequency of the transmission clock. In the above example, the parallelized multi-bit data is 8-bit in the interests of simplicity. The HDD 1 may parallelize the 6-bit data from the AD converter 213 to 60-bit data and store it in the memory with 64-bit width, resulting in the more efficient storing of the AD converted multi-bit data. In this case, the buffer circuit is modified to process two 6 bit-data, another unit is added to the registers 321a-321d, another unit is added to the output registers 322a-322d, and the counter of the frequency divider 323 is replaced with a count of 5-count modulo to change the output to ¹⁄₁₀ rate clock.

Figure 7:
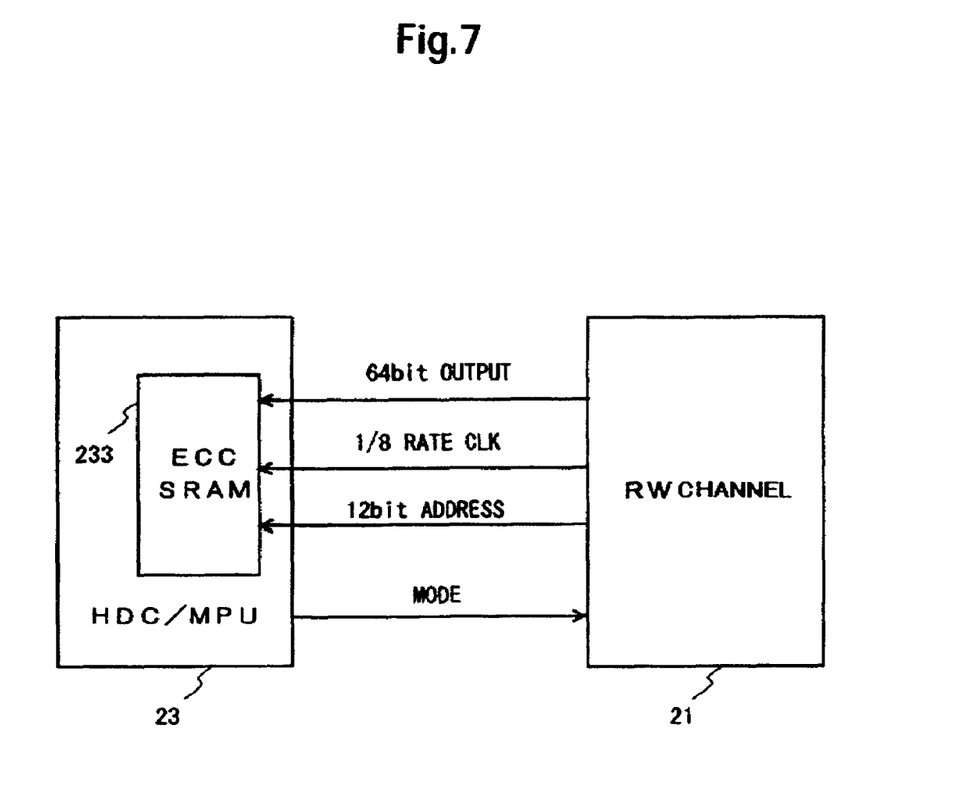
FIG. 7 shows the signals for the multi-bit data storing between the RW channel and HDC/MPU according to an embodiment of the present invention.

The SRAM 233 can not store both the normal user data and the multi-bit data at the same time. The RW channel 21 and the HDC/MPU 23 have another mode different from the usual operation mode for storing the multi-bit data. The MPU 231 controls the multi-bit data storing mode according to the microcode. FIG. 7 illustrates signals between the RW channel 21 and the HDC/MPU 23 storing the multi-bit data.

The HDC in the HDC/MPU 23 changes paths according to the instruction to turn to be the storing mode from the MPU231. Once the path change is finished, the MPU 231 notifies the RW channel 21 with the MODE signal that it is ready for the storing process and instructs the RW channel 21 to begin the process. The RW channel 21 begins the read process in this mode when the head element 12 arrives at the target data sector. And the RW channel 21 sends a 64-bit data (64 bit OUTPUT) and the address (12 bit ADDRESS) instructing the storing location to the SRAM 233. The SRAM 233 stores the data in the instructed address in sync with the clock signal (⅛ RATE CLK).

The clock number from the timing of the read start instruction from the HDC/MPU 23 or the timing of the DAM detection of the data sector may define the start and end of the read process of the RW channel 21 for the data to be stored. Or the detection of a predetermined error may be used as the reference timing. The RW channel 21 clears a counter at the beginning and counts in accordance with the clock signal (⅛ RATE CLK) to generate the address (12 bit ADDRESS) of the SRAM 233.

As set forth above, the present invention is described by way of the described embodiment but is not limited to the above embodiment. For example, the present invention is applicable to an apparatus using a medium other than the magnetic disk. Though the above described circuit configuration on the control circuit board is useful, the configuration is not limited to it. For example, all the circuit may be implemented in a single chip, or the RW channel 21 and the HDC may be implemented in the same chip and the MPU 231 may be a different chip.

The memory for storing the multi-bit data is not limited to the SRAM for ECC memory and memories for other purposed are may be used for it. A dedicated memory for the multi-bit data is not precluded. The error correction method is not limited to ECC. The memory for other error correction methods such as iterative decoding may be used for the multi-bit data. The multi-bit data to be stored may include various data in addition to the aforementioned data. The HDD 1 may, as set forth above, have the transfer lines for the multi-bit data aside from the transfer lines for the usual process, or the transfer lines for the usual process may transfer the multi-bit data. In this case, the process of each circuit in the RW channel is slipped during the transmission of the multi-bit data.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A control circuit for a medium drive apparatus comprising:
   an AD converter for converting analog signals transferred from a medium to multi-bit data;
   a decoding circuit for decoding multi-bit data transferred from the AD converter to corresponding single bit data;
   a buffer circuit for holding successively multi-bit data transferred from the AD converter toward the decoding circuit and parallelizing a plurality of the multi-bit data to transfer; and
   a memory used for storing data transferred from the buffer circuit.

2. The control circuit of claim 1, further comprising a circuit for equalizing multi-bit data transferred from the AD converter toward the decoding circuit,
   wherein the buffer circuit holds successively output data of the circuit for equalizing.

3. The control circuit of claim 2, further comprising:
   a selection circuit for selecting a circuit for outputting multi-bit data to the buffer circuit from plural circuits including the AD converter and the circuit for equalizing.

4. The control circuit of claim 1, further comprising a circuit for obtaining multi-bit data transferred from the AD converter toward the decoding circuit to output control data for clock generation,
   wherein the buffer circuit holds successively the control data.

5. The control circuit of claim 4, further comprising a selection circuit for selecting a circuit for outputting multi-bit data to the buffer circuit from plural circuits including the AD converter and the circuit for outputting the control data.

6. The control circuit of claim 1, further comprising:
   a circuit for equalizing multi-bit data transferred from the AD converter toward the decoding circuit;
   a circuit for obtaining multi-bit data transferred from the AD converter toward the decoding circuit to output control data for clock generation; and
   a selection circuit for selecting a circuit for outputting multi-bit data to the buffer circuit from plural circuits including the AD converter, the circuit for equalizing and the circuit for outputting the control data.

7. The control circuit of claim 1, wherein the memory used for storing data from the buffer circuit and processing the single bit data decoded by the decoding circuit.

8. A medium drive apparatus comprising:
   a head accessing to a medium;
   an AD converter for converting analog signals transferred from the medium to multi-bit data;
   a decoding circuit for decoding multi-bit data transferred from the AD converter to corresponding single bit data;
   a buffer circuit for holding successively multi-bit data transferred from the AD converter toward the decoding circuit before being decoded to the corresponding single bit data, and parallelizing a plurality of the multi-bit data to transfer; and
   a memory used for storing data transferred from the buffer circuit.

9. A control circuit for a medium drive apparatus comprising:
   an AD converter for converting analog signals transferred from a medium to multi-bit data;
   a decoding circuit for decoding multi-bit data transferred from the AD converter to corresponding single bit data;
   a memory used for an error correction process of data from the medium and used for storing data transferred from the AD converter toward the decoding circuit, the control circuit further comprising a buffer circuit for holding successively multi-bit data transferred from the AD converter toward the decoding circuit and parallelizing a plurality of the multi-bit data to transfer,
   wherein the memory stores parallel output data from the buffer circuit.

* * * * *